BEST AVAILABLE COPY

2

J. B. HARLOW.

Sofa-Bedsteads.

No. 5,678. Reissued Dec. 9, 1873.

Sofa Beds
Unfolding Seat
Rising Frame Sec.

Witnesses:
Frank H. Jordan.
H. W. Loutelius

Inventor:
Joseph B. Harlow
per
Wm. Henry Clifford
Att'y.

AM. PHOTO-LITHOGRAPHIC CO. N.Y. (OSBORNE'S PROCESS)

UNITED STATES PATENT OFFICE.

JOSEPH B. HARLOW, OF PORTLAND, MAINE.

IMPROVEMENT IN SOFA-BEDSTEADS.

Specification forming part of Letters Patent No. 135,643, dated February 11, 1873; reissue No. 5,678, dated December 9, 1873; application filed September 10, 1873.

*To all whom it may concern:*

Be it known that I, JOSEPH B. HARLOW, of Portland, in the county of Cumberland and State of Maine, have invented certain new and useful Improvements in Sofa-Bedsteads; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
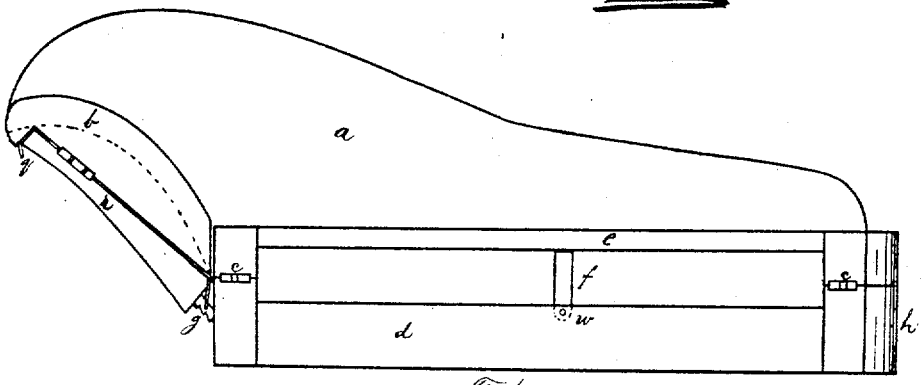
Figure 2:
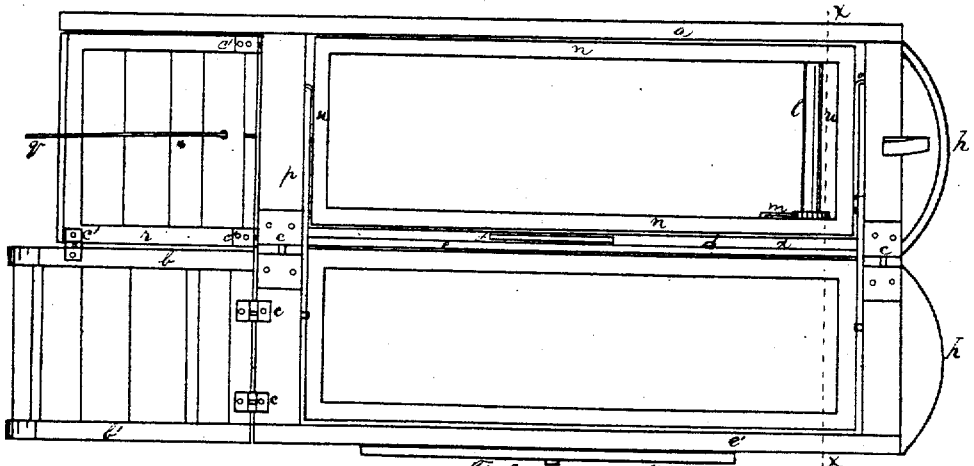
Figure 3:
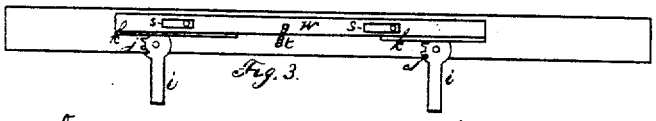
Figure 4:
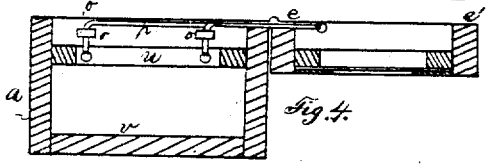

Figure 1 is a front view of my invention, and Fig. 2 is a top plan with the parts so opened as to form a bed-bottom. Fig. 3 is a detail, showing the manner of attaching and rendering adjustable the legs. Fig. 4 is a transverse section on the line *x x*, Fig. 2.

Same letters show like parts.

The object of my invention is to produce an article of furniture which can be used either as a sofa or a bedstead. When used as a lounge, the parts are so disposed as to furnish room for bed-clothes and other articles.

*a*, Fig. 1, shows the back of the lounge. *c*, in Figs. 1 and 2, shows hinges upon which the bottom, the edge of which is seen at *e*, and the head-rest, the edge of which is seen at *b*, are unfolded, so as to take the positions seen in Fig. 2. The hinges *c'* permit the two parts *r* and *b* to be raised or lowered, as desired. This motion of the head-rest is controlled by the ratchet *g*, which works against a fixed stop at the point of its contact with the body of the lounge, but not shown in the drawing. This ratchet is pivoted and is operated by the cord *q*, Figs. 1 and 2. At *e*, Fig. 1, and *e* and *e'*, Fig. 2, are shown the side rails of the frame, which, by being unfolded upon the hinges *c c*, form the extension of the width of the sofa or lounge to that of the bedstead. The frame of which *b* and *b'* form the side rails accompanies the former frame, and serves to extend the length of the bottom of the bed. *w*, Figs. 2 and 3, shows a sliding bar, which moves backward and forward by the slots *s s* and pins therein, as shown in the drawing. *i* shows legs to support the outer folding frame. They have teeth *j* to fit toothed racks *k k* on the bar. These legs can be turned up horizontally against the bar *w*, when they are not in use, as when the different parts of the invention are folded into the form of a sofa or lounge. The sliding backward and forward of the bar *w* admits of this movement of the legs. The two parts *b* and *r* of the head-rest are not attached to the back *a*. The frame composed of the rails *n n* and cross-bars *u u* moves freely up and down between the back *a* and the front *d*, Figs. 1 and 2, and is supported by the cords *p p* near each end, being suspended on them in the manner shown in Fig. 4. These cords work over pulleys, (not shown,) and have one end of each of them attached to the frame of which *e* and *e'* form the side rails. *v* shows a cross-bar resting on the floor, and connects the front *a* with the back *d*. Others may be supplied, as required, to impart the necessary stiffness and strength to the frame and the whole device. *h* shows a curved end to the sofa-bedstead, and it can be so constructed as to form a receptacle for any of the vessels used in sleeping-apartments. The swinging arm *f*, which is pivoted at *w*, Fig. 1, may be raised to a perpendicular position to prevent the rail *e* from sagging or bending downward when sat upon; and when the folding part is opened to form a bedstead, this arm *f* may be turned down to a horizontal position to prevent its interference with the working of the other parts of the device.

The frames herein described may be covered with any strong material, as, for instance, sacking or burlap. At *l*, Fig. 2, is shown a roller, having at its end the ratchet and stop *m*, which serves to tighten the sacking bottom should it become loose.

The operation of my invention is as follows: When used as a sofa my device presents the appearance shown in Fig. 1. When my device is to be used as a bedstead, the cord *q*, being pulled, raises the ratchet *g* from its catch or stop, and thus permits the head-rest, composed of the two parts *b* and *r*, to drop down, and as any of the teeth of the ratchet may rest on the stop, this head-rest may be placed at any desired angle with the other part *e* of the device. The frame whose side rails are *d* and *e* is then unfolded, and the whole bottom assumes the form shown in Fig. 2, the bar *f* being first turned down into the position shown at *f*, Fig. 2. As the frame *e e'* is unfolded and dropped down to the horizontal position indicated in Fig. 2, the frame *u u n n* is drawn up to a level with it, so that both are upon the same plane. This is done by the cords and pulleys shown in Fig. 4, and before described. When these two frames are thus in position, the mattresses are placed upon them and form the bed. When the outer frame *e e'* is unfolded, the legs *i i* are turned down into a vertical position in order to support it. The head-rest derives its support from the other portions of the device through the hinges *c' c'*. *t* is a loop for operating the sliding bar *w* when the legs *i i* are to be moved either up or down.

I do not claim any device for effecting, broadly, the folding and unfolding of the two parts of a sofa-bedstead, or the two parts that make the head-rest when the device is formed into a bed, or the extending of the length or width by the devices shown.

I do not claim a lounge where the back is hinged to a right-angled piece of iron; nor do I claim making the head adjustable by means of a ratchet, or the back of the lounge adjustable by means of a ratchet at the lower end of the above-named right-angled piece of iron, as in Patent No. 81,880, September 8, 1868.

I do not claim a sofa-bed with its arm-rests in two parts and hinged to each other, as in Patent No. 24,267, May 31, 1859.

What I claim as my invention, and desire to secure by Letters Patent, is—

1. The combination, with the fixed or immovable frame *n n*, of the movable frame *e e'*, hinged to the front *d* by the hinges *c*, and carrying hinged to it the part *b b'* by the hinges *c c*, the said part *b b'* operating, in the folding and unfolding of the lounge, substantially as herein described.

2. The combination, in a sofa-bedstead, of the head-rest *r* and *b*, hinges *c c* and *c' c'*, and ratchet *g*, provided with the cord *q*, with the frames *e* and *e'*, operating in the manner set forth.

3. The combination of the rail *e*, bar *w*, having the slots *s s*, and racks *k k*, with the supporters *i i*, provided with the gears *j j*, as set forth.

In testimony that I claim the foregoing I have hereunto set my hand this 21st day of August, 1873.

JOSEPH B. HARLOW.

Witnesses:
WM. HENRY CLIFFORD,
FRANK H. JORDAN.